United States Patent
Li (10) Patent No.: US 9,946,000 B2
(45) Date of Patent: Apr. 17, 2018

(54) DISPLAY DEVICE AND DISPLAY SYSTEM

(71) Applicant: Boe Technology Group Co., Ltd., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/912,112

(22) PCT Filed: Sep. 18, 2015

(86) PCT No.: PCT/CN2015/089973
§ 371 (c)(1),
(2) Date: Feb. 15, 2016

(87) PCT Pub. No.: WO2016/138761
PCT Pub. Date: Sep. 9, 2016

(65) Prior Publication Data
US 2017/0003431 A1    Jan. 5, 2017

(30) Foreign Application Priority Data

Mar. 5, 2015    (CN) .......................... 2015 1 0098494

(51) Int. Cl.
*G02B 5/30*    (2006.01)
*G09F 9/302*    (2006.01)
(Continued)

(52) U.S. Cl.
CPC ......... *G02B 5/3083* (2013.01); *G02B 27/286* (2013.01); *G02F 1/13* (2013.01); *G09F 9/302* (2013.01)

(58) Field of Classification Search
CPC ....... G02B 5/3083; G02B 27/286; G02F 1/13; G02F 1/13363; G02F 2001/133631;
(Continued)

(56) References Cited

U.S. PATENT DOCUMENTS

| 7,940,358 B2 * | 5/2011 | Jin | ........................ G02F 1/1323 349/104 |
| 2006/0126156 A1 * | 6/2006 | Evans | .................... G02F 1/1323 359/320 |

(Continued)

FOREIGN PATENT DOCUMENTS

| CN | 102360136 | 2/2012 |
| CN | 102651819 | 8/2012 |

(Continued)

OTHER PUBLICATIONS

Office Action from China Application No. 201510098494.6 dated Jan. 22, 2017.

(Continued)

*Primary Examiner* — Frank Font
(74) *Attorney, Agent, or Firm* — Calfee, Halter & Griswold LLP (57) ABSTRACT

A display device and display system. Each pixel cell group of the display comprises at least one first line of pixel cells for displaying information to be viewed by a dedicated spectacle wearer, a second line of pixel cells for displaying compensation information, and a third line of pixel cells for displaying naked-eye pattern information. The light adjustment mechanism allows for a difference between phase retardations experienced by the light emitted by the first line of pixel cells and by the third line of pixel cells upon passing through the light adjustment mechanism. With the display device, the viewer wearing dedicated spectacles and the naked-eye viewer are allowed to see different information, thereby improving the confidentiality of the display device in peep preventive displaying.

12 Claims, 4 Drawing Sheets

(51) Int. Cl.
*G02F 1/13* (2006.01)
*G02B 27/28* (2006.01)

(58) Field of Classification Search
CPC .................. G09F 9/302; G09G 3/3648; G09G 2300/0443; G09G 2358/00
USPC .......... 359/486.02, 489.07, 489.17; 349/119, 349/120; 345/88, 103
See application file for complete search history.

(56) References Cited

U.S. PATENT DOCUMENTS

| | | | |
|---|---|---|---|
| 2006/0193998 A1* | 8/2006 | Harding | C08J 5/18 428/1.1 |
| 2006/0203149 A1* | 9/2006 | Sato | G02F 1/133528 349/96 |
| 2007/0036917 A1* | 2/2007 | Hirakata | G02F 1/133711 428/1.31 |
| 2008/0310271 A1 | 12/2008 | Kim et al. | |
| 2009/0096734 A1* | 4/2009 | Huang | G09G 3/3648 345/89 |
| 2009/0243971 A1* | 10/2009 | Uehara | G02F 1/1323 345/32 |
| 2010/0073601 A1* | 3/2010 | Daiku | G02F 1/13362 349/65 |
| 2010/0079676 A1 | 4/2010 | Kritt et al. | |
| 2010/0128200 A1* | 5/2010 | Morishita | G02F 1/1323 349/62 |
| 2011/0234953 A1* | 9/2011 | Amimori | G02B 5/3083 349/119 |
| 2011/0234969 A1* | 9/2011 | Amimori | C09K 19/2007 349/193 |
| 2012/0019752 A1* | 1/2012 | He | G02B 27/22 349/117 |
| 2012/0028193 A1* | 2/2012 | Sawanobori | G02B 5/3016 430/321 |
| 2012/0133871 A1* | 5/2012 | Saigusa | G02B 5/3083 349/108 |
| 2012/0256976 A1* | 10/2012 | Inada | G09G 3/2007 345/690 |

FOREIGN PATENT DOCUMENTS

| | | |
|---|---|---|
| CN | 202677021 | 1/2013 |
| CN | 103235441 | 8/2013 |
| CN | 103246075 | 8/2013 |
| CN | 103713422 | 4/2014 |
| CN | 104614885 | 5/2015 |
| JP | 2001016429 | 1/2001 |
| JP | 2008310271 | 12/2008 |

OTHER PUBLICATIONS

International Search Report and Written Opinion from PCT/CN15/89973 dated Dec. 15, 2015.

* cited by examiner

DISPLAY DEVICE AND DISPLAY SYSTEM

RELATED APPLICATIONS

The present application is the U.S. national phase entry of PCT/CN2015/089973 with an International filing date of Sep. 18, 2015, which claims the benefit of Chinese Application No. 201510098494.6, filed Mar. 5, 2015, the entire disclosures of which are incorporated herein by reference.

TECHNICAL FIELD

The present invention relates to the technical field of display, and particularly to a display device and display system.

BACKGROUND

In a peep prevention display in the prior art, the display device functions to prevent peep by allowing only the eyes that wear dedicated spectacles to view an image displayed in the display device, and by leaving a naked eye that does not wear dedicated spectacles be able of viewing only an all-white image.

However, those wearing no spectacles would see only an all-white image on displays, while those wearing dedicated spectacles would appear to be viewing the same "all-white" display screen, which would appear unusual to others. Thus, it is difficult for such a display device to trick non-spectacle wearing people, thus resulting in a bad confidentiality of the display device in peep preventive displays.

SUMMARY

The present invention provides a display device and a display system comprising the display device, which can simultaneously display image information that is viewable by a naked eye while conducting peep preventive displaying, thereby improving naturalness of a viewer viewing confidential information when the display device is conducting peep preventive displaying and improving in turn confidentiality of the display device in peep preventive displays.

To achieve this, the present invention provides technical solutions as follows:

A display device comprising a display panel and a light adjustment mechanism, the display panel comprising a plurality of pixel cells distributed in an array, the plurality of pixel cells comprising a plurality of pixel cell groups arranged in a given direction, wherein:

each of the pixel cell groups comprises multiple lines of pixel cells arranged in the direction in which the plurality of pixel cell groups are arranged, wherein the multiple lines of pixel cells comprises:

at least one first line of pixel cells for displaying information to be viewed by a dedicated spectacle wearer;

a second line of pixel cells for displaying compensation information, wherein along a direction perpendicular to the direction in which the plurality of pixel cell groups are arranged, sub-pixel cells in each said first line of pixel cells and corresponding ones in the second line of pixel cells are of same colors, and a sum of brightness of display information of sub-pixel cells in each said first line of pixel cells and corresponding ones in the second line of pixel cells is a fixed value when in operation; and a third line of pixel cells for displaying pattern information to be viewed by a naked eye; and the light adjustment mechanism is located at a light exit side of the display panel, and makes light emitted out of the display panel by the first line of pixel cells, the second line of pixel cells, and the third line of pixel cells experiences respective phase retardations upon passing through the light adjustment mechanism, wherein:

a difference between the phase retardation experienced by the light emitted by each said first line of pixel cells upon passing through the light adjustment mechanism and the phase retardation experienced by the light emitted by the third line of pixel cells upon passing through the light adjustment mechanism is $(2a+1)\lambda/2$, where a is an integer; and a difference between the phase retardation experienced by the light emitted by each said first line of pixel cells upon passing through the light adjustment mechanism and the phase retardation experienced by the light emitted by the second line of pixel cells upon passing through the light adjustment mechanism is $(2a+1)\lambda/2$, where a is an integer.

With the above mentioned display device, a user wearing dedicated spectacles can see image information displayed by the first line of pixel cells when he/she is viewing images displayed on the display device. However, since light emitted by respective lines of pixel cells in each pixel cell group of the display device passes through the light adjustment mechanism, the difference between the phase retardation experienced by the light emitted by the second line of pixel cells and the third line of pixel cells, and the phase retardation experienced by the light emitted by the first line of pixel cells, is $(2a+1)\lambda/2$. Thus, the viewer wearing dedicated spectacles cannot see the information displayed by the second line of pixel cells and the third line of pixel cells; a naked-eye viewer can see the information displayed by the third line of pixel cells when viewing the display device.

Due to the fact that the second line of pixel cells is adjacent to the first line of pixel cells, and that along a direction perpendicular to the direction in which the plurality of pixel cell groups are arranged, sub-pixel cells in the first line of pixel cells and corresponding ones in the second line of pixel cells are of the same colors, and have a sum of brightness of display information which is a fixed value when in operation, the naked-eye viewer cannot distinguish between the information displayed by the second line of pixel cells and the information displayed by the first line of pixel cells when viewing the information displayed on the display device, and can only see the information displayed by the third line of pixel cells. Thus, with the above mentioned display device, the user wearing dedicated spectacles can only see the information displayed by the first line of pixel cells when viewing the display device, and the naked-eye viewer can only see the information displayed by the third line of pixel cells, such that the viewer wearing dedicated spectacles and the naked-eye viewer are allowed to see different information, thereby improving the confidentiality of the display device in peep preventive displays.

Preferably, each of the pixel cell groups has therein one said first line of pixel cells, and the second line of pixel cells is located between the first line of pixel cells and the third line of pixel cells.

Further, preferably, the light adjustment mechanism comprises a plurality of first light adjustment parts and a plurality of second light adjustment parts which are arranged in the direction in which the plurality of pixel cell groups are arranged and which are disposed alternately, wherein each of the first light adjustment parts covers one first line of pixel cells, each of the second light adjustment parts covers one second line of pixel cells and one third line of pixel cells, and a difference between the phase retardation of the light resulting from the first light adjustment part and the phase retardation of the light resulting from the second light adjustment part is $(2a+1)\lambda/2$, where a is an integer.

Preferably, each of the pixel cell groups further comprises a fourth line of pixel cells for displaying constantly black image information when viewed by the dedicated spectacle wearer, and the fourth line of pixel cells is adjacent to the third line of pixel cells and located between the second line of pixel cells and the third line of pixel cells.

Preferably, the light adjustment mechanism comprises a plurality of first light adjustment parts and a plurality of second light adjustment parts which are arranged in the direction in which the plurality of pixel cell groups are arranged and which are disposed alternately, wherein each of the first light adjustment parts covers one line of pixel cells, each of the second light adjustment parts covers one line of pixel cells, and a difference between the phase retardation of the light resulting from the first light adjustment part and the phase retardation of the light resulting from the second light adjustment part is $(2a+1)\lambda/2$, where a is an integer.

Preferably, in the light adjustment mechanism, the first light adjustment part is a positive quarter-wave plate, and the second light adjustment part is a negative quarter-wave plate.

Preferably, each of the pixel cell groups further comprises:

a fifth line of pixel cells for displaying constantly black image information when viewed by a naked eye, the fifth line of pixel cells being located at a side of the third line of pixel cells facing away from the fourth line of pixel cells; and a sixth line of pixel cells for displaying constantly black image information when viewed by the dedicated spectacle wearer, the sixth line of pixel cells being located between the fifth line of pixel cells and the third line of pixel cells.

Preferably, each of the pixel cell groups further comprises a seventh line of pixel cells for displaying constantly black image information when viewed by the dedicated spectacle wearer, and the seventh line of pixel cells is adjacent to the first line of pixel cells and located a side of the first line of pixel cells facing away from the second line of pixel cells; the light adjustment mechanism comprises a plurality of third light adjustment parts and a plurality of fourth light adjustment parts which are arranged in the direction in which the plurality of pixel cell groups are arranged and which are disposed alternately; wherein in a portion of the light adjustment mechanism corresponding to each of the pixel cell groups:

the third light adjustment part covers the first line of pixel cells and the seventh line of pixel cells, the fourth light adjustment part covers the second line of pixel cells and the third line of pixel cells, and a difference between the phase retardation of the light resulting from the third light adjustment part and the phase retardation of the light resulting from the fourth light adjustment part is $(2a+1)\lambda/2$, where a is an integer.

Preferably, each of the pixel cell groups has therein two first lines of pixel cells, wherein the second line of pixel cells is located between the two first lines of pixel cells.

Preferably, in the display panel:

the direction in which the plurality of pixel cell groups are arranged is a row direction of the pixel cells in the display panel, and each arrangement of the pixel cells are a column of the pixel cells; or the direction in which the plurality of pixel cell groups are arranged is a column direction of the pixel cells in the display panel, and each line of the pixel cells is a row of the pixel cells.

The present invention further provides a display system which comprises dedicated spectacles having lenses attached with an optical film, and which further comprises a display device according to any of the technical solutions as mentioned above.

DETAILED DESCRIPTION

The technical solutions of embodiments of the present invention will be described clearly and completely below in conjunction with the accompanying drawings of embodiments of the present invention. The described embodiments are only a part of embodiments of the present invention, rather than all of them. All other embodiments obtained by a person skilled in the art, on the basis of embodiments of the present invention, without making any inventive efforts, fall within the claimed scope of the present invention.

Figure 1:
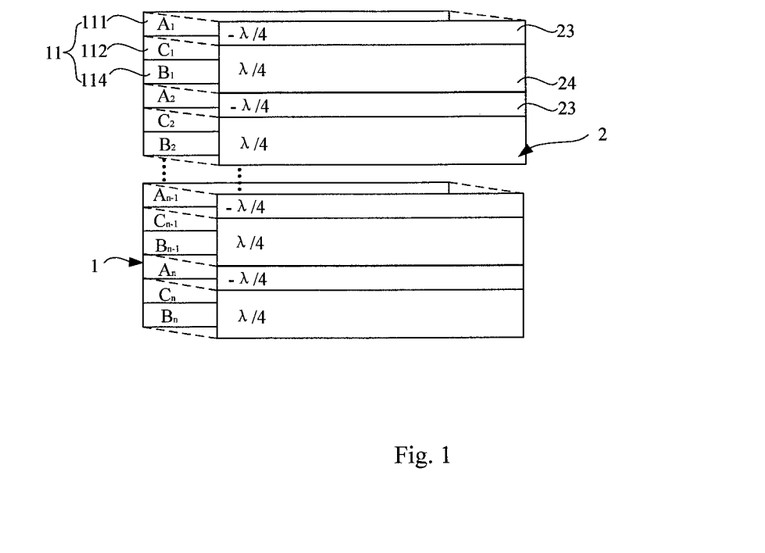
FIG. 1 is a structural schematic diagram of a display device according to an embodiment of the present invention.

Please refer to FIGS. 1-4, the display device according to an embodiment of the present invention comprises a display panel 1 and a light adjustment mechanism 2. The display panel 1 comprises a plurality of pixel cells distributed in an array, and the plurality of pixel cells comprise a plurality of pixel cell groups arranged in a given direction (e.g., a pixel cell group 11 as shown in FIG. 1), wherein:

each of the pixel cell groups comprises multiple lines of pixel cells arranged in the direction in which the plurality of pixel cell groups are arranged, wherein, taking the pixel cell group 11 as an example, the multiple lines of pixel cells in the pixel cell group 11 comprises:

at least one first line of pixel cells 111 for displaying information A1-An to be viewed by a dedicated spectacle wearer;

a second line of pixel cells 112 for displaying compensation information C1-Cn (where n is a positive integer), wherein along a direction perpendicular to the direction in which the plurality of pixel cell groups 11 are arranged, sub-pixel cells in each first line of pixel cells 111 and corresponding ones in the second line of pixel cells 112 are of same colors, and a sum of brightness of display information of sub-pixel cells in each first line of pixel cells 111 and corresponding ones in the second line of pixel cells 112 is a fixed value when in operation; and a third line of pixel cells 114 for displaying pattern information Bn to be viewed by a naked eye.

The light adjustment mechanism 2 is located at a light exit side of the display panel 1, and makes light emitted out of the display panel 1 by the first line of pixel cells 111, the second line of pixel cells 112, and the third line of pixel cells 114 experiences respective phase retardations upon passing through the light adjustment mechanism 2.

A difference between the phase retardation experienced by the light emitted by each first line of pixel cells 111 upon passing through the light adjustment mechanism 2 and the phase retardation experienced by the light emitted by the third line of pixel cells 114 upon passing through the light adjustment mechanism 2 may be $(2a+1)\lambda/2$, where a is an integer.

A difference between the phase retardation experienced by the light emitted by each said first line of pixel cells upon passing through the light adjustment mechanism and the phase retardation experienced by the light emitted by the second line of pixel cells upon passing through the light adjustment mechanism may be $(2a+1)\lambda/2$, where a is an integer.

It is readily understood by the person skilled in the art that, in FIGS. 1-4, the display panel 1 and the light adjustment mechanism 2 are arranged without overlapping with each other only for ease of description, and that in a practical device, both of them should be arranged to be overlapped with each other vertically. Furthermore, the shape parameters, such as aspect ratios, of the display panel 1 and the light adjustment mechanism 2 illustrated in the figure are exemplary, and the specific size of the display panel 1 and the light adjustment mechanism 2 may be adapted to an actual size of the display device.

With the above mentioned display device, a user wearing dedicated spectacles can see image information displayed by the first line of pixel cells 111 when he/she is viewing images displayed on the display device. However, since light emitted by respective lines of pixel cells in each pixel cell group 11 of the display device passes through the light adjustment mechanism 2, the difference between the phase retardation experienced by the light emitted by the second line of pixel cells 112 and the third line of pixel cells 114, and the phase retardation experienced by the light emitted by the first line of pixel cells 111, is $(2a+1)\lambda/2$, such that a polarization direction of the linearly polarized light resulting from the light emitted by the second line of pixel cells 112 and the third line of pixel cells 114 passing through the light adjustment mechanism 2 is perpendicular to a polarization direction of the linearly polarized light resulting from the light emitted by the first line of pixel cells 111 passing through the light adjustment mechanism 2. Thus, the viewer wearing dedicated spectacles cannot see the information displayed by the second line of pixel cells 112 and the third line of pixel cells 114; a naked-eye viewer can see the information displayed by the third line of pixel cells 114 when viewing the display device. The dedicated spectacles include e.g. a polarizer, through which the linearly polarized light resulting from the light emitted by the first line of pixel cells 111 passing through the light adjustment mechanism 2 passes.

Due to the fact that the second line of pixel cells 112 is adjacent to the first line of pixel cells 111, and that along a direction perpendicular to the direction in which the plurality of pixel cell groups 11 are arranged, sub-pixel cells in the first line of pixel cells 111 and corresponding ones in the second line of pixel cells 112 are of the same colors, and have a sum of brightness of display information which is a fixed value when in operation, to it follows that, in the information seen by the naked-eye viewer, the information displayed by the first line of pixel cells 111 is hidden due to the compensation for a display brightness of the first line of pixel cells 111 from the second line of pixel cells 112 , and the information is not recognizable by the viewer in a naked-eye state. Therefore, the naked-eye viewer cannot distinguish between the information displayed by the second line of pixel cells 112 and the information displayed by the first line of pixel cells 111 in viewing the information displayed on the display device, and can only see the information displayed by the third line of pixel cells 114. Thus, with the above mentioned display device, the user wearing dedicated spectacles can only see the information displayed by the first line of pixel cells 111 in viewing the display device, and the naked-eye viewer can only see the information displayed by the third line of pixel cells 114, such that the viewer wearing dedicated spectacles and the naked-eye viewer are allowed to see different information, thereby improving the confidentiality of the display device in peep preventive displays.

As shown in FIGS. 1-4, in each pixel cell group 11, the second line of pixel cells 112 is located between the first line of pixel cells 111 and the third line of pixel cells 114.

In the display device as disclosed in the above embodiments, the pixel cells in each pixel cell group 11 may be arranged in various ways.

In a first embodiment, as shown in FIG. 1, the pixel cell group 11 may have therein only one first line of pixel cells 111, and have only the first line of pixel cells 111, the second line of pixel cells 112, and the third line of pixel cells 114. The light adjustment part 23 in the light adjustment mechanism 2 is used for covering the first line of pixel cells 111, and the light adjustment part 24 in the light adjustment mechanism 2 is used for covering the second line of pixel cells 112 and the third line of pixel cells 114. The difference between the phase retardations of the light resulting from the light adjustment part 23 and the light adjustment part 24 is $(2a+1)\lambda/2$, where a is an integer. By way of example, as shown in FIG. 1, the light adjustment part 23 is a negative quarter-wave plate, and the light adjustment part 24 is a positive quarter-wave plate.

In the above scheme 1, each pixel cell group 11 has therein only three lines of pixel cells, resulting in a high resolution for a viewer in viewing the display device, regardless of the viewer is a naked-eye viewer or a viewer wearing dedicated spectacles.

In a second embodiment, in addition to the first line of pixel cells 111, the second line of pixel cells 112, and the third line of pixel cells 114, each pixel cell group 11 may further comprise therein a fourth line of pixel cells 113 for displaying constantly black image information A0 when viewed by the dedicated spectacle wearer. Specifically, as shown in FIG. 2, the fourth line of pixel cells 113 is adjacent to the third line of pixel cells 114 and located between the second line of pixel cells 112 and the third line of pixel cells 114.

The fourth line of pixel cells 113 prevents "cross-talk" between the displayed information in the second line of pixel cells 112 and the displayed information in the third line of pixel cells 114. In turn, theis enables improvement of the definition of the information displayed by the third line of pixel cells 114 and viewed by the naked-eye viewer, improving the quality of the image viewed by the naked-eye viewer.

Figure 2:
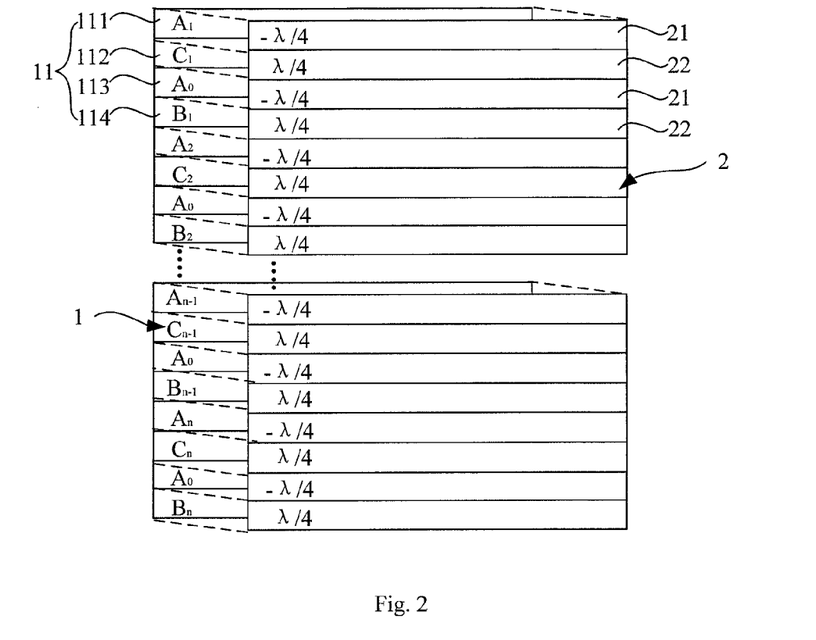
FIG. 2 is a structural schematic diagram of a display device according to another embodiment of the present invention.

Specifically, as shown in FIG. 2, when the individual lines of the pixel cells are arranged in the pixel cell group 11 in a way of scheme 2, the light adjustment mechanism 2 comprises first light adjustment parts 22 and second light adjustment parts 21 which are arranged in the direction in which the plurality of pixel cell groups 11 are arranged and which are disposed alternately. Therein, each of the first light adjustment parts 22 covers one line of pixel cells, each of the second light adjustment parts 21 covers one line of pixel cells, and a difference between the phase retardations of the light resulting from the first light adjustment part 22 and the second light adjustment part 21 is $(2a+1)\lambda/2$, where a is an integer.

More preferably, in the light adjustment mechanism 2, the first light adjustment part 22 is a positive quarter-wave plate, and the second light adjustment part 21 is a negative quarter-wave plate.

As shown in FIG. 2, in the respective pixel cell group, the second line of pixel cells 112 is covered by the first light adjustment part 22, and the third line of pixel cells 114 is covered by the first light adjustment part 22. Meanwhile, the first line of pixel cells 111 is covered by the second light adjustment part 21, and the fourth line of pixel cells 113 is covered by the second light adjustment part 21. This ensures that the difference between the phase retardation experienced by the light emitted by the first line of pixel cells 111 upon passing through the second light adjustment part and the phase retardation experienced by the light emitted by the third line of pixel cells 114 upon passing through the first light adjustment part 22 is $\lambda/2$.

Of course, in the light adjustment mechanism 2, it is possible that the phase retardation of the light resulting from the first light adjustment part 22 is 0, and the phase retardation of the light resulting from the second light adjustment part 21 is $\lambda/2$. This also ensures that the difference between the phase retardation experienced by the light emitted by the first line of pixel cells 111 upon passing through the second light adjustment part and the phase retardation experienced by the light emitted by the third line of pixel cells 114 upon passing through the first light adjustment part 22 is $\lambda/2$.

Figure 3:
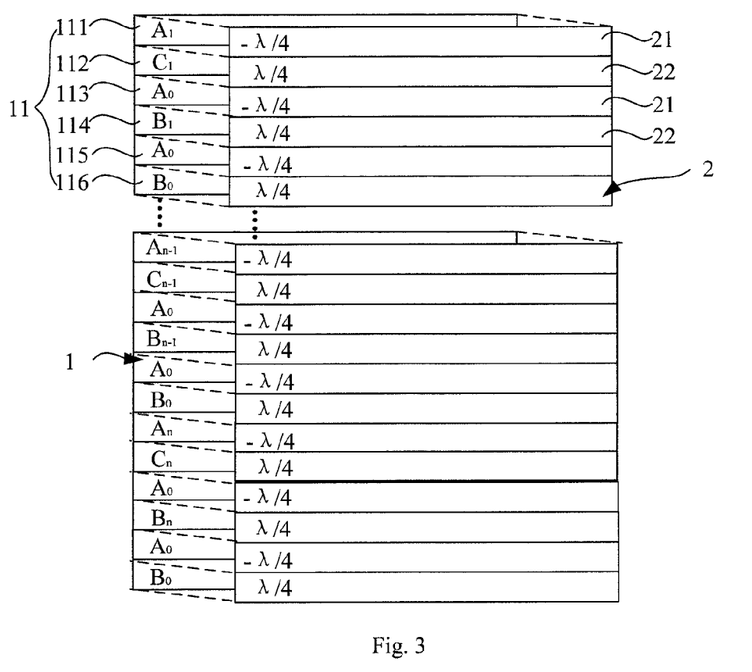
FIG. 3 is a structural schematic diagram of a display device according to another embodiment of the present invention.

In a third embodiment, as shown in FIG. 3, in addition to the first line of pixel cells 111, the second line of pixel cells 112, and the third line of pixel cells 114, each pixel cell group 11 further comprises:

a fifth line of pixel cells 116 for displaying constantly black image information B0 when viewed by a naked eye, the fifth line of pixel cells 116 being located at a side of the third line of pixel cells 114 facing away from the fourth line of pixel cells 113; and a sixth line of pixel cells 115 for displaying constantly black image information A0 when viewed by the dedicated spectacle wearer, the sixth line of pixel cells 115 being located between the fifth line of pixel cells to 116 and the third line of pixel cells 114.

The arrangement of the fifth line of pixel cells 116 and the sixth line of pixel cells 115 can prevent "cross-talk" between the image information displayed by the third line of pixel cells 114 in a pixel cell group 11 and the first line of pixel cells 111 in another pixel cell group 11, thereby further improving the definition of the image information viewed by the naked-eye viewer.

Figure 4:
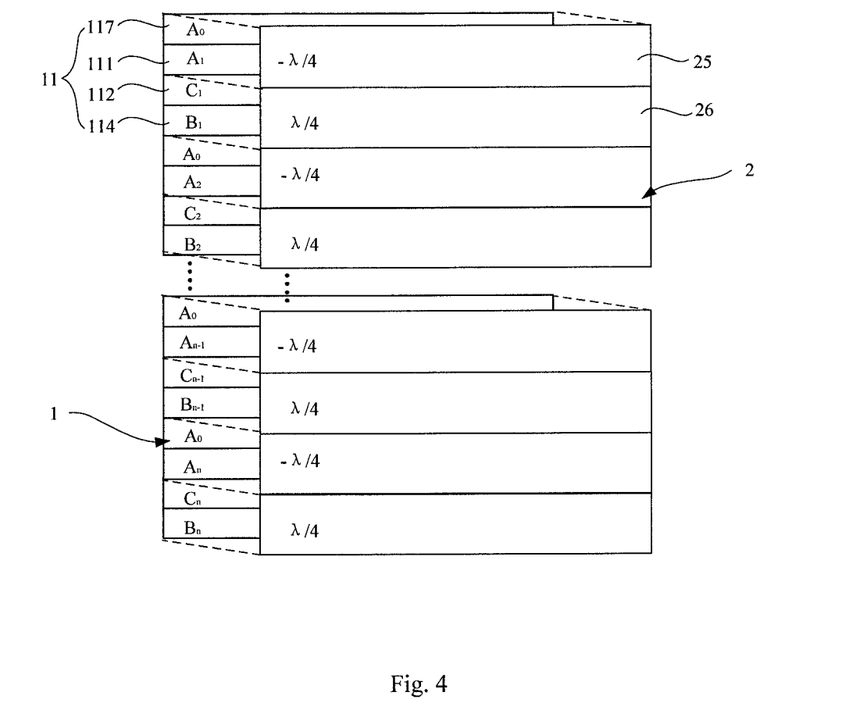
FIG. 4 is a structural schematic diagram of a display device according to another embodiment of the present invention.

In a fourth embodiment, as shown in FIG. 4, in addition to the first line of pixel cells 111, the second line of pixel cells 112, and the third line of pixel cells 114, each pixel cell group 11 further comprises a seventh line of pixel cells 117 for displaying constantly black image information A0 when viewed by the dedicated spectacle wearer. The seventh line of pixel cells 117 is adjacent to the first line of pixel cells 111 and located a side of the first line of pixel cells 111 facing away from the second line of pixel cells 112. The light adjustment mechanism 2 comprises third light adjustment parts 25 and fourth light adjustment parts 26 which are arranged in the direction in which the plurality of pixel cell groups 11 are arranged and which are disposed alternately; wherein in a respective portion of the light adjustment mechanism 2 corresponding to each of the pixel cell groups 11.

The third light adjustment parts 25 covers the first line of pixel cells 111 and the seventh line of pixel cells 117, the fourth light adjustment parts 26 covers the second line of pixel cells 112 and the third line of pixel cells 114, and a difference between the phase retardations of the light resulting from the third light adjustment part 25 and the fourth light adjustment part 26 is $(2a+1)\lambda/2$, where a is an integer.

In this embodiment, each of the third light adjustment parts 25 and the fourth light adjustment parts 26 in the light adjustment mechanism 2 covers two lines of pixel cells, achieving the same display effect as the display device structured in scheme 2. Moreover, the number of the third light adjustment parts 25 and the fourth light adjustment parts 26 in the light adjustment mechanism 2 is less than the number of the first light adjustment parts 22 and the second light adjustment parts 21 in scheme 2, facilitating the arrangement of the light adjustment mechanism 2.

Figure 5:
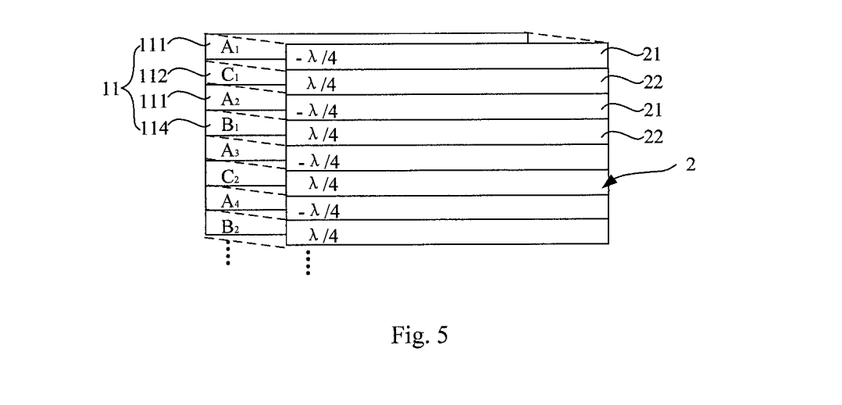
FIG. 5 is a structural schematic diagram of a display device according to another embodiment of the present invention.

In a fifth embodiment, in the pixel cell groups 11, as shown in FIG. 5, each pixel cell group comprises therein two first lines of pixel cells 111, and the second line of pixel cells 112 is located between these two first lines of pixel cells 111. A display device structured as such enables increase of the resolution of the image viewed by the dedicated spectacle wearer.

Specifically, in the display panel 1:

the direction in which the plurality of pixel cell groups 11 are arranged is a row direction of the pixel cells in the display panel 1, and each line of the pixel cells are a column of the pixel cells; or the direction in which the plurality of pixel cell groups 11 are arranged is a column direction of the pixel cells in the display panel 1, and each line of the pixel cells are a row of the pixel cells.

Embodiments of the present invention further provide a display system, which comprises dedicated spectacles having lenses attached with an optical film, and which further comprises a display device according to any of the above embodiments.

Obviously, various modifications and variations can be made by those skilled in the art without departing from the spirit and scope of the present invention. Thus, in case the modifications and variations to the present invention are within the scope of claims of the present invention and equivalents thereof, these modifications and variations are intended to be encompassed in the present invention. In the claims, the word "comprises" or "comprising" does not exclude presence of elements or steps that are not listed in the claims. The word "a" or "an" preceding an element does not exclude presence of a plurality of such elements. The mere fact that certain measures are recited in mutually different dependent claims does not indicate that a combination of these measures cannot be used to advantage.

The invention claimed is:

1. A display device, comprising: a display panel and a light adjustment mechanism, the display panel comprising a plurality of pixel cells distributed in an array, the plurality of pixel cells comprising a plurality of pixel cell groups arranged in a given direction, wherein:

each one of the pixel cell groups comprises multiple lines of pixel cells arranged in the direction in which the plurality of pixel cell groups are arranged, wherein the multiple lines of pixel cells comprises:
   at least one first line of pixel cells for displaying information to be viewed by a dedicated spectacle wearer;
   a second line of pixel cells for displaying compensation information, wherein along a direction perpendicular to the direction in which the plurality of pixel cell groups are arranged, sub-pixel cells in each said first line of pixel cells and corresponding ones in the second line of pixel cells are of same colors, and a sum of brightness of display information of sub-pixel cells in each said first line of pixel cells and corresponding ones in the second line of pixel cells is a fixed value when in operation; and
   a third line of pixel cells for displaying pattern information to be viewed by a naked eye; and
the light adjustment mechanism is located at a light exit side of the display panel, and makes light emitted out of the display panel by the first line of pixel cells, the second line of pixel cells, and the third line of pixel cells experience respective phase retardations upon passing through the light adjustment mechanism, wherein:
a difference between the phase retardation experienced by the light emitted by each said first line of pixel cells upon passing through the light adjustment mechanism and the phase retardation experienced by the light emitted by the third line of pixel cells upon passing through the light adjustment mechanism is $(2a+1)\pi/2$; and
a difference between the phase retardation experienced by the light emitted by each said first line of pixel cells upon passing through the light adjustment mechanism and the phase retardation experienced by the light emitted by the second line of pixel cells upon passing through the light adjustment mechanism is $(2a+1)\pi/2$, wherein a is an integer.

2. The display device according to claim 1, wherein said each one of the pixel cell groups has therein one said first line of pixel cells, and that the second line of pixel cells is located between the first line of pixel cells and the third line of pixel cells.

3. The display device according to claim 2, wherein the light adjustment mechanism comprises a plurality of first light adjustment parts and a plurality of second light adjustment parts which are arranged in the direction in which the plurality of pixel cell groups are arranged and which are disposed alternately, wherein each of the first light adjustment parts covers one first line of pixel cells, each of the second light adjustment parts covers one second line of pixel cells and one third line of pixel cells, and a difference between the phase retardation of the light resulting from the first light adjustment part and the phase retardation of the light resulting from the second light adjustment part is $(2a+1)\pi/2$, where a is an integer.

4. The display device according to claim 3, wherein each of the pixel cell groups further comprises a fourth line of pixel cells for displaying constantly black image information when viewed by the dedicated spectacle wearer, and the fourth line of pixel cells is adjacent to the third line of pixel cells and located between the second line of pixel cells and the third line of pixel cells.

5. The display device according to claim 4, wherein the light adjustment mechanism comprises a plurality of first light adjustment parts and a plurality of second light adjustment parts which are arranged in the direction in which the plurality of pixel cell groups are arranged and which are disposed alternately, wherein each of the first light adjustment parts covers one line of pixel cells, each of the second light adjustment parts covers one line of pixel cells, and a difference between the phase retardation of the light resulting from the first light adjustment part and the phase retardation of the light resulting from the second light adjustment part is $(2a+1)\pi/2$, where a is an integer.

6. The display device according to claim 5, wherein in the light adjustment mechanism the first light adjustment part is a positive quarter-wave plate, and the second light adjustment part is a negative quarter-wave plate.

7. The display device according to claim 5, wherein each of the pixel cell groups further comprises:
   a fifth line of pixel cells for displaying constantly black image information when viewed by the naked eye, the fifth line of pixel cells being located at a side of the third line of pixel cells facing away from the fourth line of pixel cells; and
   a sixth line of pixel cells for displaying constantly black image information when viewed by the dedicated spectacle wearer, the sixth line of pixel cells being located between the fifth line of pixel cells and the third line of pixel cells.

8. The display device according to claim 7, wherein each of the pixel cell groups further comprises a seventh line of pixel cells for displaying constantly black image information when viewed by the dedicated spectacle wearer, that the seventh line of pixel cells is adjacent to the first line of pixel cells and located a side of the first line of pixel cells facing away from the second line of pixel cells, and that the light adjustment mechanism comprises a plurality of third light adjustment parts and a plurality of fourth light adjustment parts which are arranged in the direction in which the plurality of pixel cell groups are arranged and which are disposed alternately, wherein in a respective portion of the light adjustment mechanism corresponding to each of the pixel cell groups; and
   the third light adjustment parts cover the first line of pixel cells and the seventh line of pixel cells, the fourth light adjustment parts covers the second line of pixel cells and the third line of pixel cells, and a difference between the phase retardation of the light resulting from the third light adjustment part and the phase retardation of the light resulting from the fourth light adjustment part is $(2a+1)\pi/2$, where a is an integer.

9. The display device according to claim 1, wherein each of the pixel cell groups has therein two first lines of pixel cells, wherein the second line of pixel cells is located between the two first lines of pixel cells.

10. The display device according to claim 1, wherein in the display panel:
   the direction in which the plurality of pixel cell groups are arranged is a row direction of the pixel cells in the display panel, and each line of the pixel cells are a column of the pixel cells; or
   the direction in which the plurality of pixel cell groups are arranged is a column direction of the pixel cells in the display panel, and each line of the pixel cells are a row of the pixel cells.

11. A display system comprising dedicated spectacles having lenses attached with an optical film, and further comprising a display device according to claim 1.

12. The display system according to claim 11, wherein the lenses in the dedicated spectacles comprise polarizers.

* * * * *